INVENTOR
Stanley T. Deakin
By Rosins & Peterson
ATTORNEYS

Dec. 15, 1959

S. T. DEAKIN

ELECTRONIC EQUIPMENT 2,917,286

Filed Nov. 12, 1957

4 Sheets-Sheet 2

INVENTOR
Stanley T. Deakin
By Morris & Bateman
ATTORNEYS

Dec. 15, 1959 S. T. DEAKIN 2,917,286
ELECTRONIC EQUIPMENT
Filed Nov. 12, 1957 4 Sheets-Sheet 3

INVENTOR
Stanley T. Deakin
By Morris & Bateman
ATTORNEYS

Dec. 15, 1959 S. T. DEAKIN 2,917,286

ELECTRONIC EQUIPMENT

Filed Nov. 12, 1957 4 Sheets-Sheet 4

INVENTOR
Stanley T. Deakin
By Norris & Bateman
ATTORNEYS 2,917,286

ELECTRONIC EQUIPMENT

Stanley Thomas Deakin, Ewell West, England, assignor to Siemens Edison Swan Limited, London, England, a British company Application November 12, 1957, Serial No. 695,647

Claims priority, application Great Britain November 13, 1956

7 Claims. (Cl. 257—263)

This invention relates to electronic equipment and more particularly to electronic equipment of the kind employing semi-conductor devices such as rectifiers and transistors.

Such devices generate heat and it is necessary to dissipate this heat. Such heat dissipation is of special importance in the case of permanent semi-conductors in which the maximum temperature at which the device will operate is strictly limited.

The present invention comprises electronic equipment including a chassis member which is either of metal or formed with a metallic coating together with a resilient socket type holder mounted on or secured to the chassis and adapted to support a semi-conductor device in such a manner as to provide a good heat conducting path between the exterior of the semi-conductor device and the chassis or metallic part of the chassis.

The holder may be of a socket type into which a semi-conductor device may be plugged and detachably held.

The invention also comprises electronic equipment including a chassis member which is at least partly metallic and one or more semi-conductor devices carried thereon by holders forming thermal conducting paths between the said semi-conductor or semi-conductors and the chassis member or metallic part thereof.

The invention is applicable to printed circuits.

In order that the invention may be more clearly understood reference will now be made to the accompanying drawings, in which.

Figure 1:
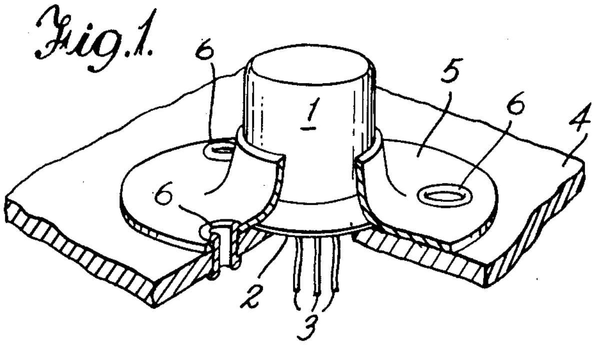
Fig. 1 shows an example of apparatus in which the semi-conductor device is secured to the chassis in a non-detachable manner.

Referring to Fig. 1 the reference 1 indicates the semi-conductor device which is of a cylindrical shape with a flange 2 at the lower end and conductor leads 3 protruding downwards. The device is mounted on a metal chassis plate 4 by means of a collar 5 which is secured to the plate 4 by rivets 6. Alternatively, screws could be used.

Figures 2, 3:
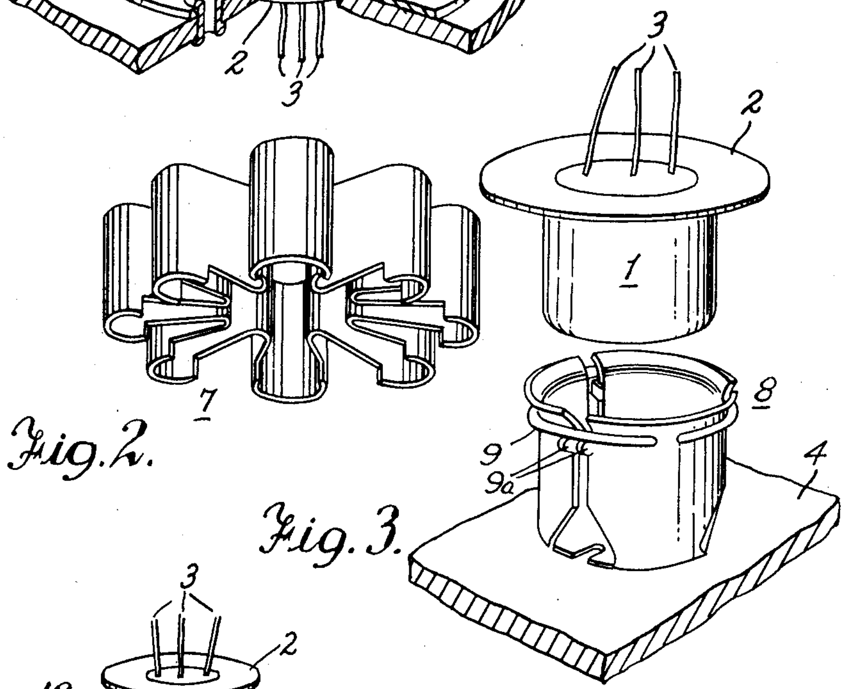
Fig. 2 shows an example of a supplementary heat dissipating device which may be clipped over the semi-conductor.
Fig. 3 is a perspective view of an arrangement in which the semi-conductor device is detachably mounted in the holder.

Fig. 2 shows a corrugated sheet metal heat dissipator 7 which may be spring pressed over the device 1 so as to improve the heat dissipation.

Figure 4:
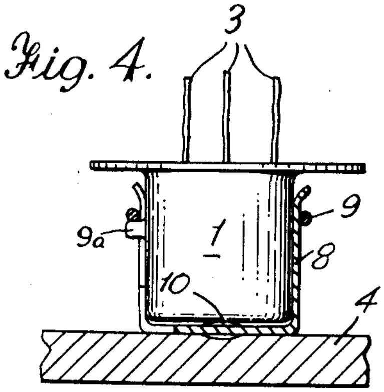
Fig. 4 is a vertical sectional view of the arrangement shown in Fig. 3.

Figs. 3 and 4 show an alternative form of holder for a semi-conductor device in which the semi-conductor is arranged with the leads 3 protruding upwardly. The device comprises a sheet metal cup 8 formed in three resilient sectors with a surrounding wire clip 9 and is so arranged that the device 1 may be pushed down into the cup where it is held in place by the resilient pressure exerted by the sectors when the clip 9 is pushed up over the stops **9*a*. Whilst the cup is shown as split into three sectors this is by way of example only as clearly there can be any convenient number or, in fact, only one split. The base of the cup 8 is secured to the chassis plate 4 by welding or soldering at 10** or alternatively, of course, it can be riveted or screwed.

Figures 5, 6, 7:
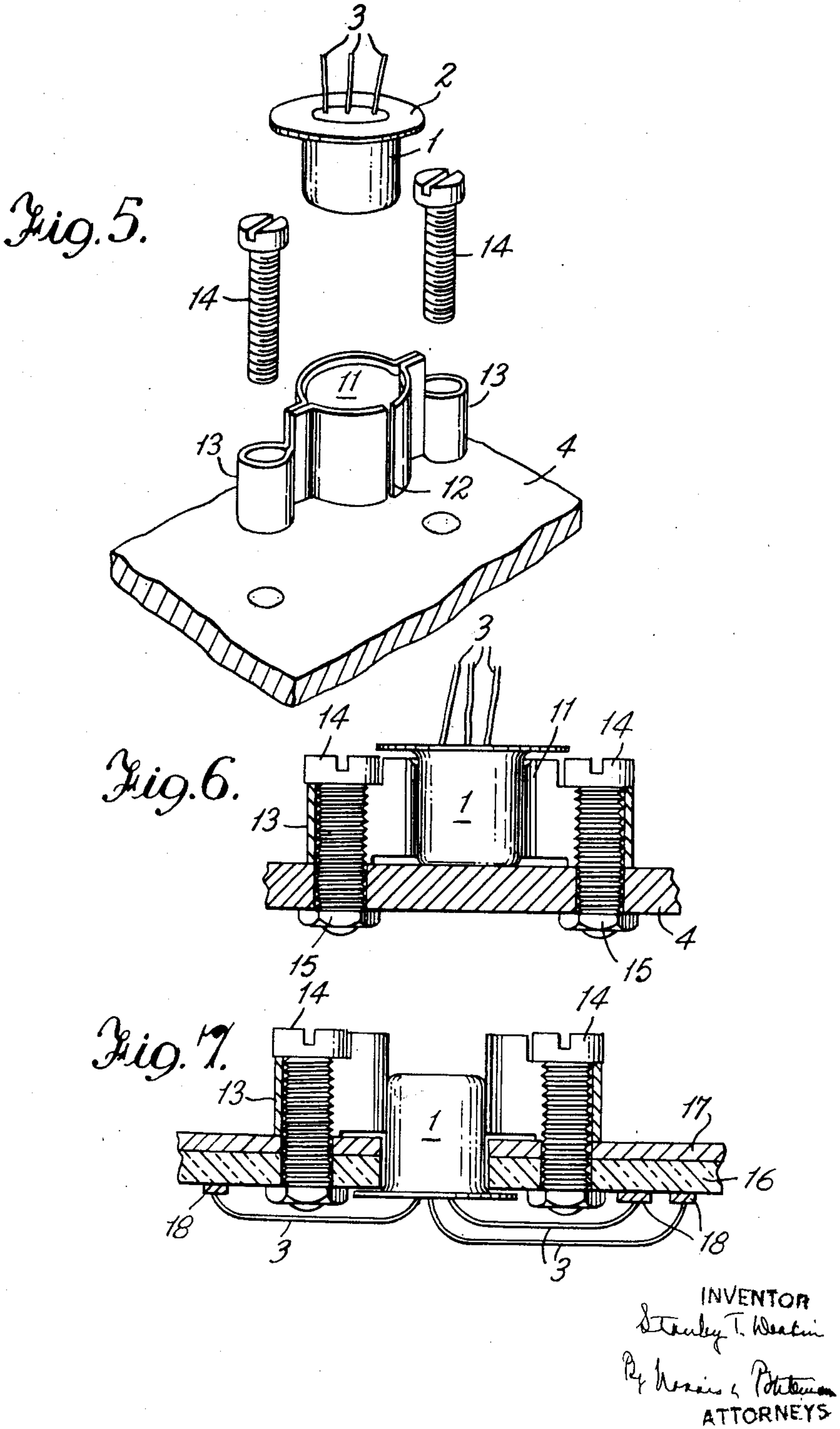
Fig. 5 is an exploded view of an alternative arrangement.
Fig. 6 is a vertical sectional view of the arrangement of Fig. 5 when assembled.
Fig. 7 is a view corresponding to Fig. 6 but showing a modified arrangement which may be employed in the case of printed circuits.

Figs. 5 and 6 show an alternative to the construction of Figs. 3 and 4 in which the socket member 11 is formed with a central cup-shaped part which has a split 12 along at least one side whilst on diametrically opposite sides there are formed lugs 13 through which pass screws 14 which engage nuts 15 to clamp the socket member to the base plate 4.

Fig. 7 shows how the device of Figs. 5 and 6 can be employed in the case of a printed circuit. In this case the base plate comprises an insulation board 16 having a metal coating 17 (which, of course, need not extend all over) on the upper surface and printed circuitry indicated at 18 on the lower surface. The composite board is apertured so that a semi-conductor device may be pushed through from underneath and make contact with the socket on the upper face. The leads 3 are then opened and attached to suitable positions of the printed circuitry.

It will be appreciated that the invention contemplates that in practice a number of semi-conductor devices will be secured to a chassis together with other components to constitute an electronic circuit.

Figure 8:
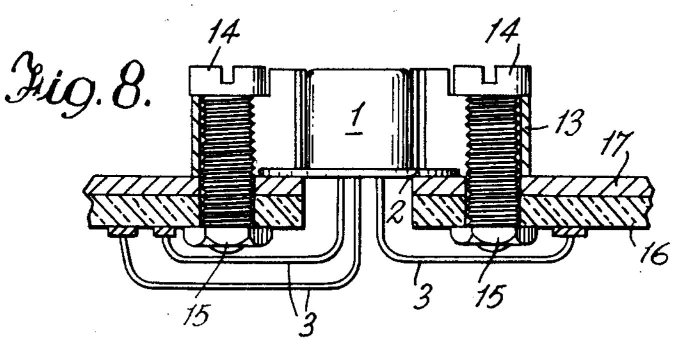
Figs. 8 and 9 show further modifications of the arrangements shown in Figs. 6 and 7.

Fig. 8 shows an arrangement similar to that shown in Fig. 7 but in this case the flange 2 of the transistor rests on the top surface of the plate 17 instead of on the under surface of the plate 16, as shown in Fig. 7. In other words, the transistor is wholly on the top of the chassis plate. It will be appreciated that, of course, it is necessary to undo the screws 14 to remove the transistor.

Figure 9:
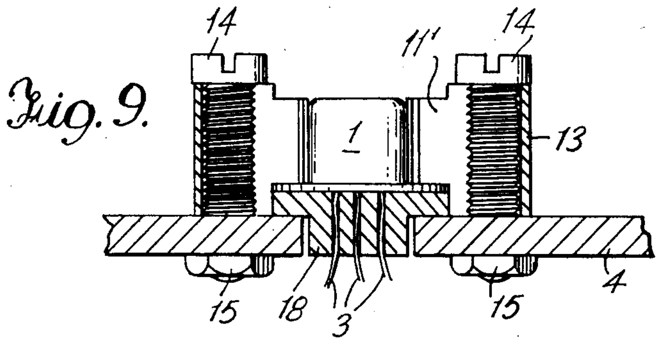

Fig. 9 shows a further modification which is similar to the arrangement shown in Fig. 8 excepting that in this case the holder 11' is a modification of the holder 11 shown in Fig. 5 inasmuch as the underneath side is cut away to provide for an insulating bushing 18 on which the transistor 1 rests and the leads 3 pass through apertures in the bushing 18.

Figure 10:
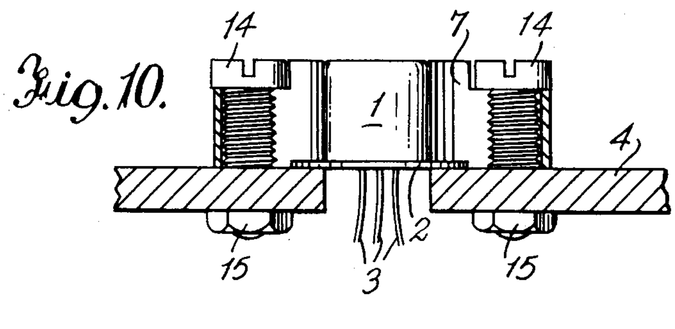
Fig. 10 shows an arrangement embodying the device shown in Fig. 2.

Fig. 10 shows a further arrangement in which the holder is of the kind shown in Fig. 2 and clamping screws pass through a pair of diametrically opposite loops. The transistor 1 in this case rests on the upper surface of the chassis plate 4 which in this case may be a wholly metal plate or, alternatively, it can of course be a metal surfaced insulating plate. In this case it is necessary to undo the screws 14 in order to remove the transistor. Alternatively, of course, the transistor could be pushed in from the top with the leads projecting upwardly, as in the case of the arrangement shown in Fig. 6.

Figure 11:
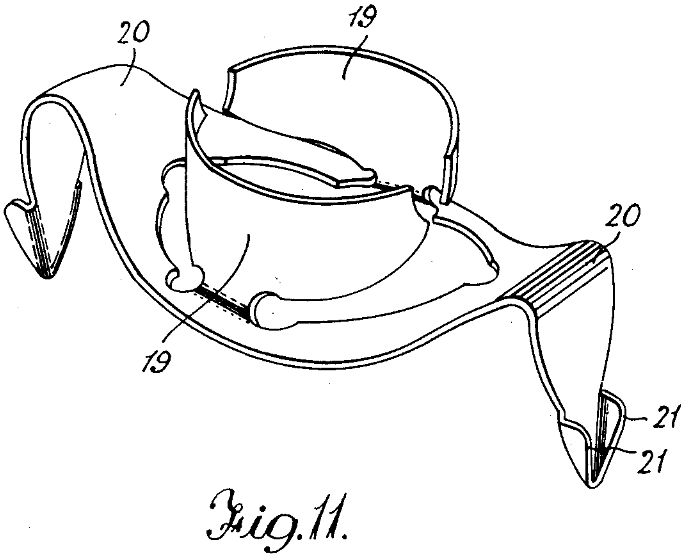
Figs. 11 and 12 show a further embodiment.
Figure 12:
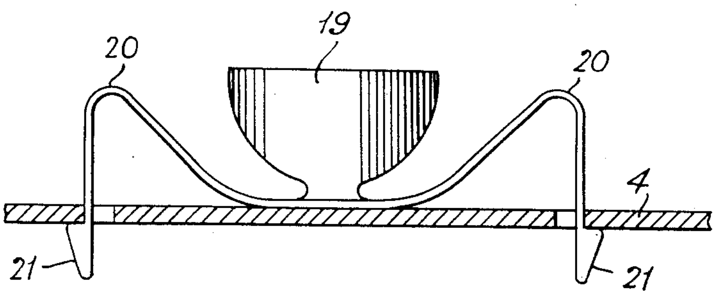

The arrangement shown in Figs. 11 and 12 comprises a spring clip stamped from a single sheet of metal, which is formed with a pair of side lugs 19 forming a holder for the transistor and a pair of resilient side arms 20. The side arms 20 pass through apertures in a chassis plate 4 and at their ends are formed with ears 21 which hook into the under surface of the chassis plate and retain the holder in contact with the upper face of the chassis plate. Here again it is assumed that the chassis plate is either of metal or is formed with a metallic coating preferably on its upper face.

Such a holder may be employed in dip soldering processes.

With this arrangement the transistor may either be pushed into the top of the holder, as in Fig. 6, or the chassis plate may be apertured and the transistor pushed into the holder from underneath, as in Fig. 7, or it may be non-detachably supported as in Figs. 8, 9 or 10.

Whilst in the foregoing it has been assumed that the transistors are mounted in a chassis plate it will be appreciated that any suitable support may be employed such as a water cooled chassis or even a metallic or metallic coated block.

Figure 13:
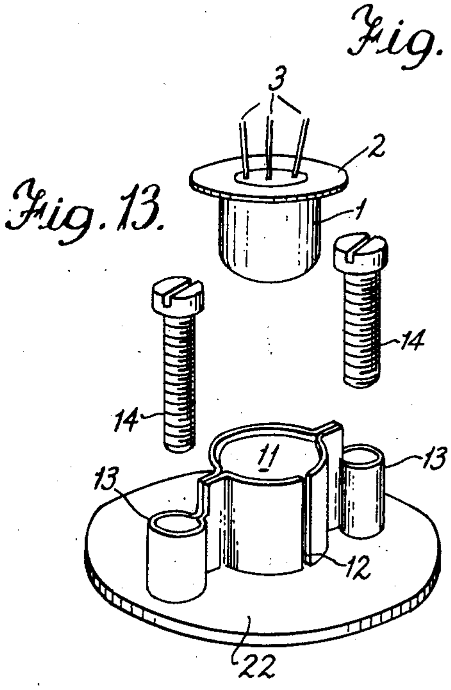
Fig. 13 shows a further modified arrangement.

Fig. 13 shows another arrangement which is a socket of the kind shown in Fig. 5 with a base plate 22. This is of sufficient thickness to act as a heat sink on its own to dissipate the heat from the transistor whilst at the same time in normal practice it would be secured onto a supporting structure which in this case may be metallic or metallic surfaced or in some cases may be purely an insulating surface as the heat sink 22 may provide heat dissipation without relying upon the chassis or other support. The base plate 22 is arranged to make good contact with the socket and it may be integral with it. Clearly, the base plate may take other forms, for instance it may be in the form of a cup-shaped member for the transistor socket.

What I claim is:

1. Electronic equipment including a chassis member, at least a metallic surface to said chassis member, a semi-conductor holder, said holder comprising a strip of sheet metal corrugated about a central axis, interior loops to said holder strip adapted to press inwardly against a semi-conducting device, external loops to said holder strip and means extending through said external loops and clamping the holder to the chassis member so as to make good thermal contact with the metallic surface.

2. Electronic equipment including a chassis member, at least a metallic surface to said chassis member, a resilient sheet metal semi-conductor holder, a hollow cylindrical socket portion to said holder into which a semi-conductor device may be plugged, wing members extending outwardly from said socket portion, loops to said wing members and means extending through said loops and clamping the holders to the chassis member so as to make good thermal conductive contact with the metallic surface.

3. In electronic apparatus, a chassis plate having at least a metallic surface, a transistor of the kind having a cylindrical casing with an annular flange around one end of the casing and a thermally conductive holder comprising a hollow cylindrical socket portion of strip sheet metal extending around said transistor, cylindrical casing shoulders defining cut-away portions of said socket accommodating said annular flange, at least two supporting wing members to said socket, said wing members comprising strip sheet metal continuous with the socket and bent about axes parallel to the socket and coupling members extending through said wing members and clamping said holder and transistor casing against the metallic surface of the chassis plate.

4. A thermally conductive holder for transistors of the kind having a cylindrical casing, comprising a socket portion formed of strip sheet metal, at least two supporting wing members to said socket said wing members being formed of strip sheet continuous with the socket and bent about axes parallel with the socket.

5. A thermally conductive holder for transistors of the kind having a cylindrical casing, comprising a socket portion formed of strip sheet metal bent about an axis into a hollow cylinder and at least two supporting wing members to said socket said wing members being formed of strip sheet metal continuous with the strip forming the socket and bent about axes parallel with the socket and externally to the socket.

6. A thermally conductive holder for transistors of the kind having a cylindrical casing with an annular flange about one end of the casing, comprising a socket portion formed of strip metal bent about an axis into a hollow cylinder and at least two lugs to said socket, said lugs being formed of strip sheet metal continuous with the strip forming the socket and bent about axes parallel with the socket and externally to the socket and shoulders to said socket portion defining cut-away portions for accommodating the transistor flange.

7. In electronic apparatus a chassis plate having at least a metallic surface, a transistor of the kind having a cylindrical casing, a thermally conductive holder, said holder comprising a hollow cylindrical socket portion of strip sheet metal extending around said transistor casing, at least two supporting wing members to said socket, said wing members comprising strip sheet metal continuous with the socket and bent about axes parallel to the socket and coupling members extending through said wing members and clamping said holder against the metallic surface of the chassis plate.

References Cited in the file of this patent

UNITED STATES PATENTS

| | | |
|---|---|---|
| 1,763,796 | MacDonald | June 17, 1930 |
| 2,100,042 | Travis | Nov. 23, 1937 |
| 2,601,027 | Keim | June 17, 1952 |
| 2,735,636 | Snyder | Feb. 21, 1956 |
| 2,770,435 | Becker | Nov. 13, 1956 |
| 2,794,962 | Donato | June 4, 1957 |
| 2,798,695 | Arleque | July 9, 1957 |
| 2,825,881 | Del Camp | Mar. 4, 1958 |

FOREIGN PATENTS

| | | |
|---|---|---|
| 745,002 | Great Britain | Feb. 15, 1956 |